Figure 1:
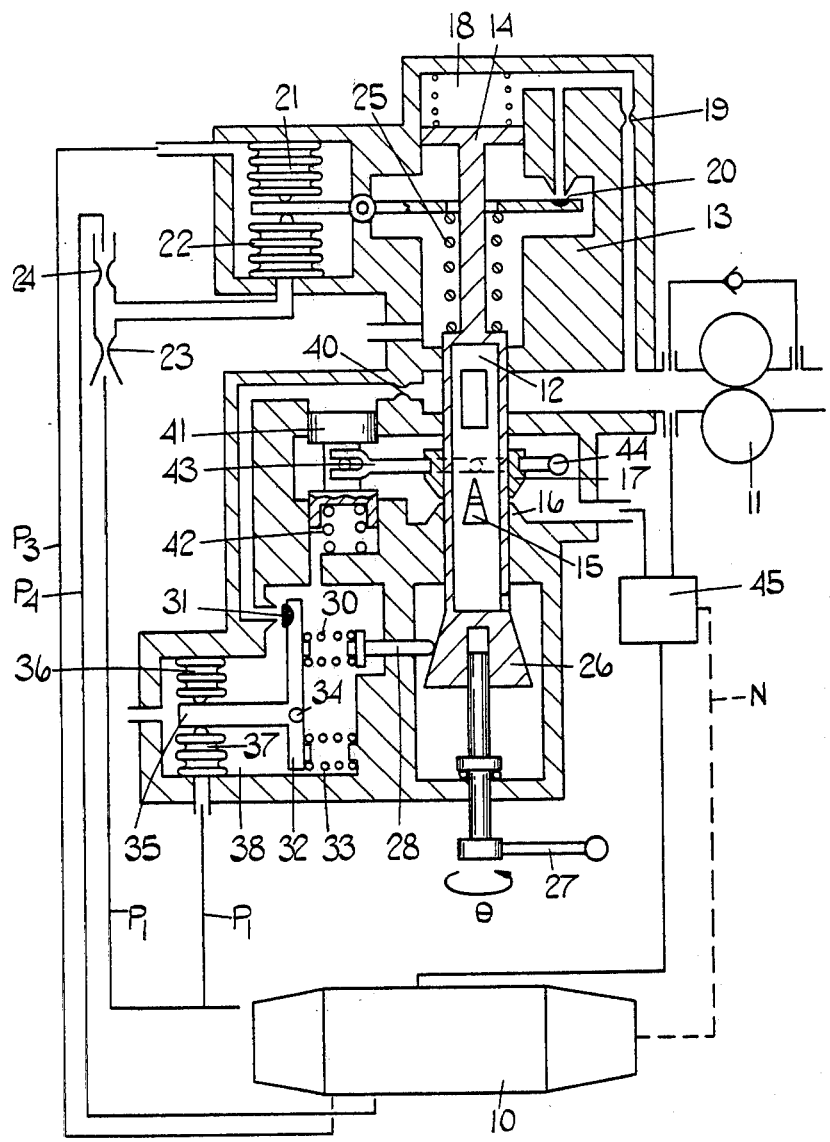

United States Patent [19]

Lewis et al.

[11] 4,300,348

[45] Nov. 17, 1981

[54] FUEL CONTROL SYSTEM FOR A GAS TURBINE ENGINE

[75] Inventors: Geoffrey A. Lewis, Solihull; Brian E. Sparks, Shrewley Common, both of United Kingdom

[73] Assignee: Lucas Industries Limited, Birmingham, England

[21] Appl. No.: 125,276

[22] Filed: Feb. 27, 1980

[30] Foreign Application Priority Data

Apr. 10, 1979 [GB] United Kingdom ............... 12667/79

[51] Int. Cl.³ ............................ F02C 9/28; F02C 9/38
[52] U.S. Cl. .............................................. 60/39.28 R
[58] Field of Search ........................ 60/39.28 R, 243

[56] References Cited

U.S. PATENT DOCUMENTS

| | | | |
|---|---|---|---|
| 3,011,310 | 12/1961 | Longstreet | 60/39.28 R |
| 3,023,801 | 3/1962 | Kinney | 60/39.28 R |
| 3,139,727 | 7/1964 | Torell | 60/39.28 R |
| 3,172,259 | 3/1965 | North | 60/39.28 R |
| 3,192,988 | 7/1965 | Porter et al. | 60/39.28 R |

Primary Examiner—Robert E. Garrett

[57] ABSTRACT

A gas turbine engine fuel control system has a metering device which is controlled by the delivery pressure of the engine compressor, and an arrangement for modifying flow through the metering device in accordance with the difference between a calculated value of the pressure rise across the compressor, and a measured value of this pressure rise. The calculated value is obtained from a compound cam which is positioned in accordance with desired engine thrust and with one of the compressor pressures and is profiled in accordance with desired values of the other pressure. Movement of a cam follower is compared with a sensed value of the other pressure and used to modify fuel flow.

11 Claims, 4 Drawing Figures

FUEL CONTROL SYSTEM FOR A GAS TURBINE ENGINE

This invention relates to fuel control systems for gas turbine engines.

For controlling the thrust of a gas turbine engine it is desirable that a fuel control system shall be responsive to the air pressure at the engine compressor inlet and to a delivery pressure of the compressor, as well as to the operating position of a device by means of which a desired thrust may be selected. Such a system is shown in British Pat. No. 1,231,791.

It is also known from the above patent to provide that the response of the system to the aforesaid compressor inlet and delivery pressures is effected by a plurality of air pressure regulating valves which are responsive to the aforesaid air pressures and through which air from the engine compressor flows. Air delivered by the compressor is usually hot and may include contaminants and can thus have an adverse affect on the air pressure regulating valves.

It is an object of the present invention to provide a fuel control system for a gas turbine engine, in which fuel flow is regulated in accordance with a compressor inlet pressure and a compressor delivery pressure, and in which the use of air pressure regulating valves is avoided.

According to the invention a system for controlling fuel flow to a gas turbine engine in accordance with a difference between an inlet pressure and a delivery pressure of the engine compressor, comprises a metering device having a control element, means for positioning said control element in accordance with a sensed value of said delivery pressure, means for modifying fuel flow through said metering device, a three-dimensional cam movable in response to a desired engine thrust and in response to one of said pressures, said cam being profiled in accordance with calculated values of the other of said pressures, said calculated values corresponding to combinations of said desired thrust and said one pressure, a cam follower co-operating with said cam, and control means responsive to the position of said cam follower and to a sensed value of said other pressure for operating said fuel flow modifying means.

In a particular embodiment said metering device comprises a body with respect to which said control element is axially movable, and said flow modifying means comprises a sleeve movable relative to said body and said control element, and co-operating therewith to define a variable metering orifice.

In an alternative embodiment said flow modifying means comprises a spill valve operable to spill fuel from the upstream side of said metering device.

In a particular embodiment said pilot valve is responsive to the pressure difference across said metering device.

Figure 2:
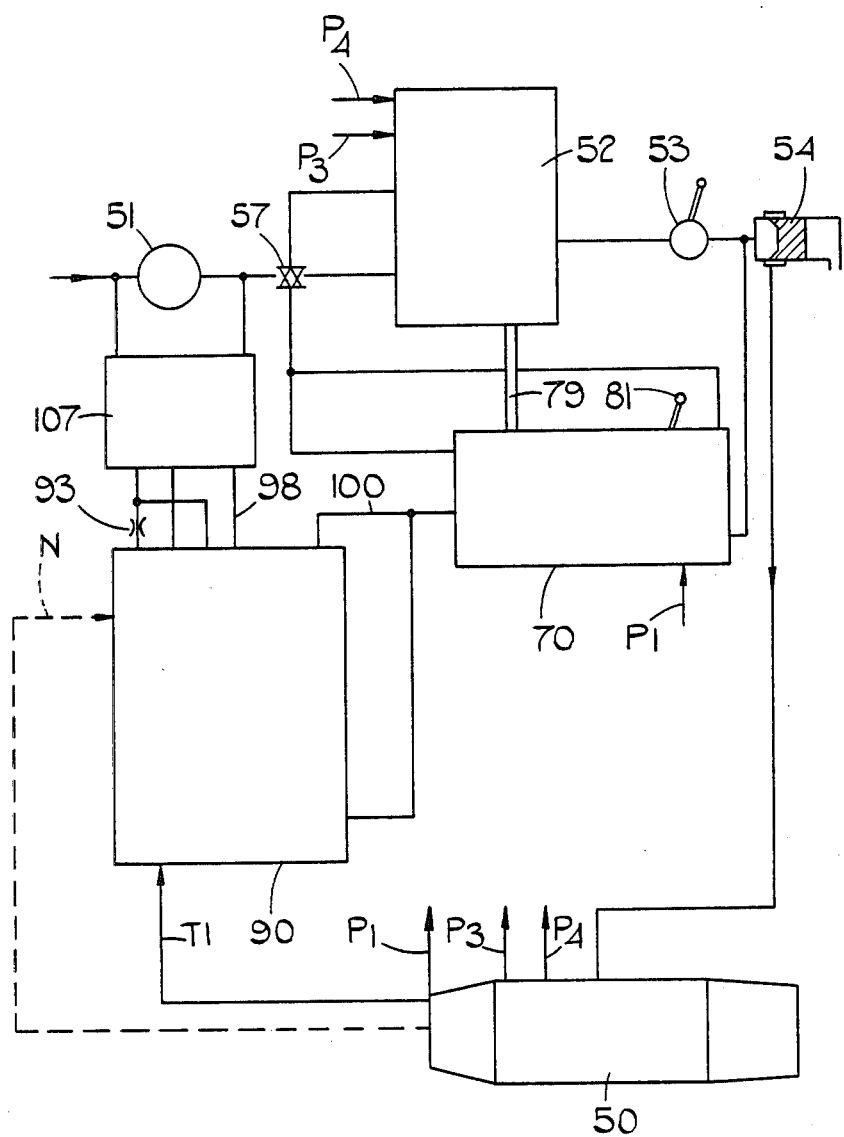
Figure 3:
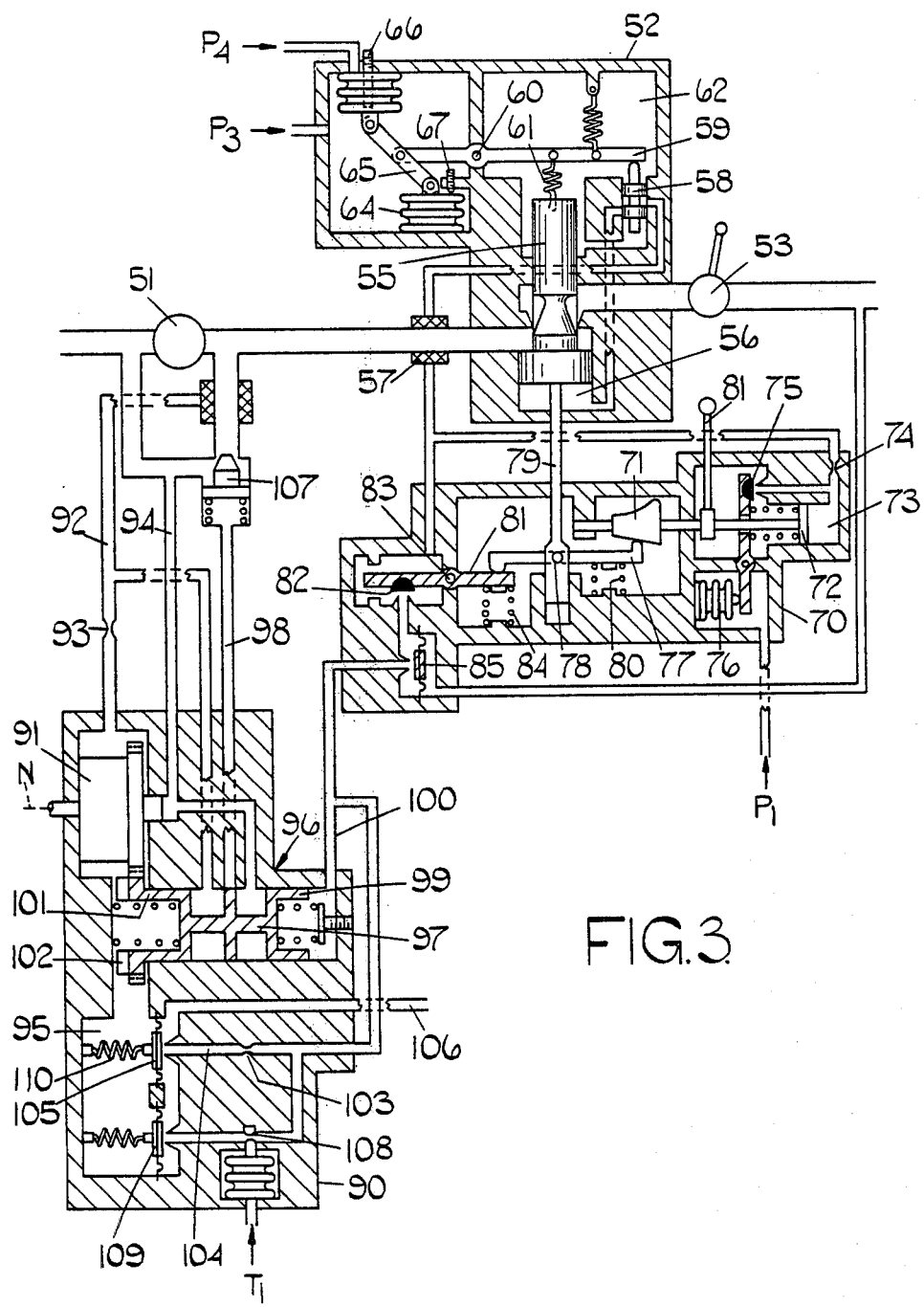
Figure 4:
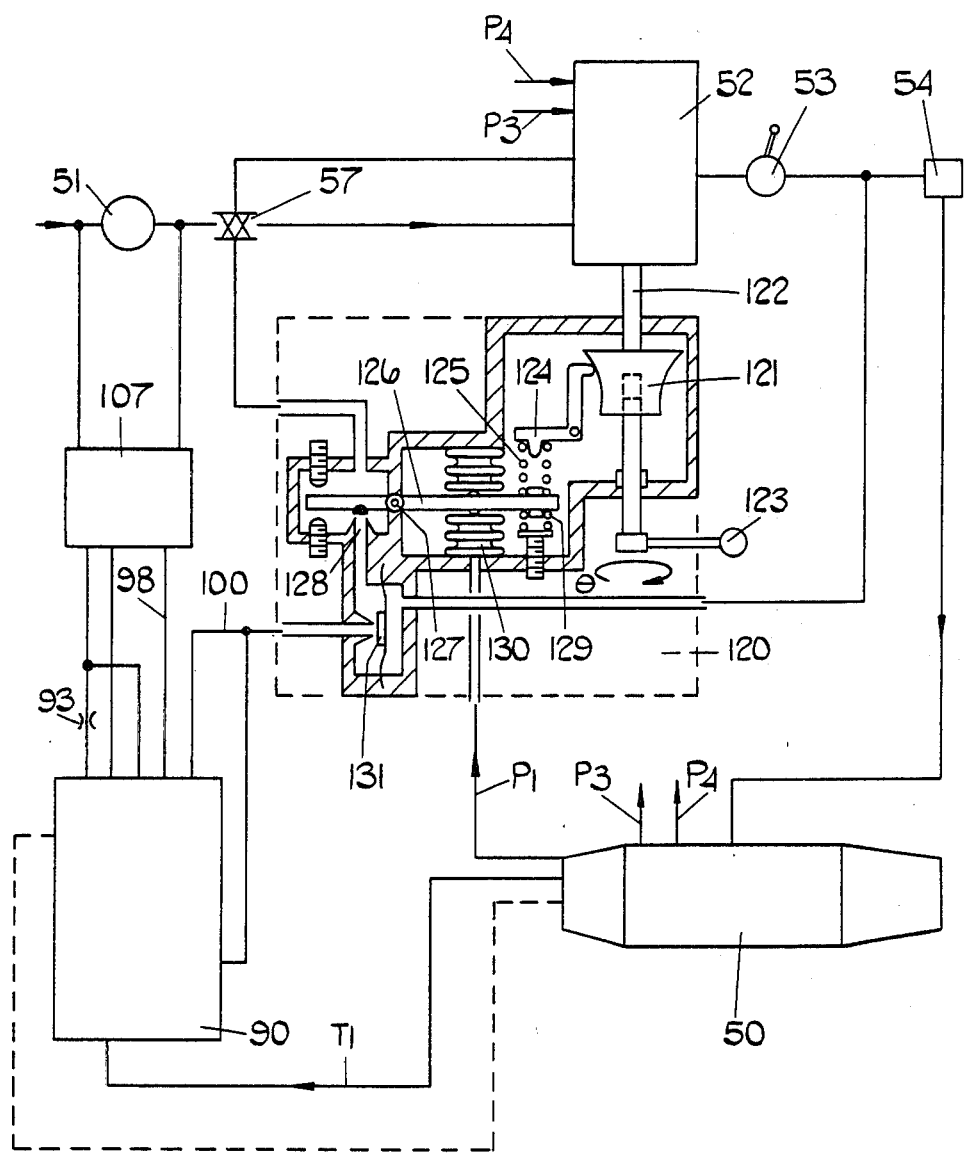

Embodiments of the invention will now be described by way of example only and with reference to the accompanying drawings in which:

FIG. 1 shows, diagrammatically, a first example of fuel control system according to the invention, FIG. 2 is a block diagram of a second example of fuel control system, FIG. 3 shows in more detail the component blocks of the system of FIG. 2, and FIG. 4 is a modification of the embodiment of FIGS. 2 and 3.

As shown in FIG. 1 a gas turbine engine 10 is supplied with fuel by a pump 11, through a metering device which includes a sleeve control element 12 axially slidable in a body 13 by means of a piston 14. The control element 12 includes a triangular port 15 which co-operates in a manner to be described with an edge 16 of the body 13 and with a further sleeve 17 which surrounds the sleeve 12, to define a variable metering orifice.

The sleeve 12 is positioned by the piston 14 in accordance with the pressure in a chamber 18, this pressure being derived from the pressure at the outlet of the pump 11, and being that between a flow restrictor 19 and a valve 20. Flow through the valve 20 is controlled by two coupled bellows units 21, 22, the bellows unit 21 being evacuated and subjected externally to an intermediate pressure $P_3$ of the compressor of the engine 10. The bellows unit 22 is of larger diameter than the unit 21 and is subjected internally to a pressure $P_{4p}$ which is that intermediate two restrictors 23, 24 connected in series between an inlet zone and an outlet zone of the engine compressor, at respective pressures $P_1$ and $P_4$. A feedback spring 25 is engaged between the sleeve 12 and an arm of the valve 20.

A compound, three-dimensional cam 26 is connected to the sleeve 12 for axial movement therewith. The sleeve 12 and cam 26 are rotatable by a lever 27 in accordance with a desired thrust $\theta$ of the engine 10. The cam 26 has a profile which corresponds to calculated values of the compressor inlet pressure, for a plurality of the values of outlet pressure $P_4$ and desired thrust $\theta$ which are used to position the cam 26 respectively axially and angularly. A cam follower 28 is biased into engagement with the cam 26 by a spring 30. A pilot valve 31 has a lever control element 32 which is biased by a spring 33 in a direction to increase flow through the valve 31. The spring 30 is engaged between the cam follower 28 and the control element 32 so as to urge the latter to reduce flow through the valve 31. The control element 32 is mounted for movement about a pivot 34 and has an arm 35 which engages two coupled bellows units 36, 37. The bellows unit 36 is evacuated and the unit 37 is subjected internally to the compressor inlet pressure $P_1$. The units 36, 37 are subjected externally to a low return fuel pressure in a chamber 38 into which the valve 31 opens.

A flow restrictor 40 is in series with the valve 31 between the outlet of the pump 11 and the chamber 38. A servo pressure signal between the valve 31 and restrictor 40 is applied to a piston 41 which is biased against this servo pressure signal by a spring 42. A lever 43 is mounted for movement about a pivot 44 and co-acts with both the sleeve 17 and the piston 41, whereby movement of the piston 41 varies flow through the metering orifice defined by the control element 12, edge 16 and sleeve 17.

Downstream of the metering device is a unit 45 which is responsive to the pressure drop through the metering orifice and to the speed $N$ of the engine, so as to maintain the metering pressure drop substantially constant for a given engine speed, and proportional to $N^2$.

In use, the sleeve control element 12 is positioned axially by the pressure in chamber 18, in accordance with the forces acting on the bellows units 21, 22, that is a force proportional to $P_{4p} - aP_1$, where $P_{4p}$ is a proportion of compressor delivery pressure $P_4$ and $a$ is the difference in effective areas of the bellows unit 21, 22. Axial movement of the control element 12 results in corresponding movement of the cam 26 which is also rotated, as previously described, in accordance with a desired thrust of the engine 10. The profile of the cam 26 is such as to move the follower 28 by an amount corresponding to a calculated value of inlet pressure P1 for the values of P4 and θ which have positioned the cam 26. If movement of the follower 28 compresses spring 30 sufficiently to overcome the pressure P1 applied to the bellows unit 37, that is if the actual pressure P1 is lower than that indicated by the cam 26, the control element 32 moves to reduce flow through the valve 31 and thereby to increase the servo pressure signal applied to the piston 41. In this case the lever 43 is moved anti-clockwise and moves the sleeve 17 to reduce the effective flow area of the metering orifice, thereby reducing fuel flow and reducing the compressor outlet pressure P4 to that commensurate with the actual sensed value of inlet pressure P1.

It is readily to be understood that if the actual sensed value of pressure P1 was greater than that indicated by the cam 26 the sleeve 17 would be moved to increase fuel flow through the control element 12 and the metering orifice of which it forms part.

The arrangement described thus provides control of engine thrust, which may effectively be considered as a function of the difference between pressures P4 and P1, and also provides for modification of this thrust in terms of inlet pressure P1. The control system is thus responsive to changes in altitude and ambient air temperature, both of which are reflected in inlet pressure P1.

FIGS. 2 and 3 should be read in conjunction, corresponding features having been allocated identical reference numerals. As shown in FIG. 2 a gas turbine engine 50 is supplied with fuel from a pump 51 by way of a metering device 52 a shut-off valve 53 and a spring-loaded pressure responsive valve 54. As shown more clearly in FIG. 3 the metering device 52 has a control element 55 which is axially movable in response to changes in a pressure in a chamber 56. The pressure in chamber 56 is derived from that at the outlet of the pump 51 by way of a filter 57 and is regulated by a spool valve 58 which is acted upon by a lever 59. The lever 59 is sealingly mounted for movement about a pivot 60. A feed-back spring 61 interconnects the lever 59 and control element 55. The spool valve 58 is operable to vary the connection of the chamber 56 to the filter 57 and to a chamber 62 at a low return pressure.

A bellows unit 63 is subjected internally to the engine compressor delivery pressure P4. The bellows unit 63 and a further bellows unit 64 are subjected externally to an intermediate pressure P3 of the compressor. Bellows units 63, 64 are pivotally connected to respective ends of a link 65, whose mid-point is pivotally interconnected to an end of the lever 59. An adjustable stop 66 limits movement of the bellows 63 in response to an increase in pressure P3, and a further adjustable stop 67 limits movement of the bellows 64 in response to a reduction of pressure P3. The arrangement is such that above a predetermined value of the ratio P4/P3, expansion of the bellows 64 will be arrested by the stop 67, and the link 65 will pivot about its connection with the bellows 64, whereby the valve 58 and control element 55 are responsive only to pressure P4. When the ratio P4/P3 falls below the aforesaid predetermined level the bellows 63 will engage the stop 66, and the bellows 64 will pivot the link 65 about its connection with the bellows 63, whereby the control element 55 becomes responsive only to pressure P3.

A steady-state control device 70 is shown in detail in FIG. 3. A three-dimensional compound cam 71 is axially movable by a piston 72 which is axially positioned in accordance with the pressure in a chamber 73, this pressure being derived from the pressure at filter 57 and being that between a flow restrictor 74 and a valve 75, the valve 75 being positioned by a bellows 76 in accordance with the inlet pressure P1 of the engine compressor. The cam 71 is rotatable by a lever 77 in accordance with a desired value θ of thrust of the engine 10. The cam 71 has a profile corresponding to calculated values of the compressor delivery pressure P4 for a plurality of the values of inlet pressure P1 and desired thrust θ which are used to position the cam 71. A cam follower 77 is mounted for movement about a pivot 78 which is axially movable with the control element 55, by means of a stem 79. One end of the follower 77 is biased into engagement with the cam 71 by a spring 80, and the other of the follower 77 engages a lever control element 81 for a valve 82. The lever 81 is sealingly mounted for movement about a pivot 83 and is biased by a spring 84 in a direction to reduce flow through the valve 82. The valve 82 communicates with the filter 57 and a diaphragm valve 85 has its opposite sides subjected to the pressures downstream of the valve 82 and downstream of the shut-off valve 53. In use, the shut-off valve 53 is wide open, so that the diaphragm valve 85 is effectively responsive to the pressure at the outlet of the metering device 52.

The arrangement is such that if an actual, detected value of delivery pressure P4 is greater than the calculated value of P4 derived from the cam 71, the cam follower 77 will pivot anticlockwise, compressing the spring 84 and increasing flow through the valve 82, the pressure difference across the valve 82 nevertheless being maintained equal to that across the metering device 52, by the valve 85. Similarly, if the detected pressure P4 is less than the corresponding calculated value derived from the cam 71, flow through the valve 82 is decreased.

A servo pressure control arrangement 90 is shown in detail in FIG. 3 and is responsive to the pressure downstream of the diaphragm valve 85. The control 90 includes a speed-responsive valve 91 of the type which is shown in British Pat. No. 880,757 and which is driven at the speed N of the engine 10. Fuel from a high pressure supply line 92 flows to the valve 91 through a restrictor 93, and from the valve 91 to a low pressure return line 94. The valve 91 supplies a chamber 95 with a pressure proportional to $N^2$. A pilot valve 96 has a spool control element 97 which is axially movable to supply a servo pressure signal on a line 98, this servo pressure signal being intermediate the pressures in the supply line 92 and return line 94. The control element 97 is coupled to a piston 99 which is responsive to the pressure in a line 100 downstream of the diaphragm valve 85. The control element 97 is also coupled to a rotor 101 which is drivingly engaged with the valve 91 so as to be rotated thereby. The rotor 101 is provided with vanes 102 which act on the fuel in chamber 95. The vanes 102 create a centrifugal pressure difference which is dependent on the speed of the rotor 101 and the density of the fuel in chamber 95. Since the pressure at the periphery of the rotor 101 is that within chamber 95, it follows that the pressure acting on rotor 101 to urge the latter axially is the difference between the pressure in chamber 95 generally, and the aforesaid centrifugal pressure difference. That is if the pressure in chamber 95 is $K_1 N^2$ then the pressure acting on the rotor 101 will be $K_1N^2-K_2N^2\rho$ where $K_1$ and $K_2$ are respective constants proportional to the speeds of the valve 91 and rotor 101, and $\rho$ is the fuel density.

A fixed flow restrictor 103 is in series between the line 100 and communicates through a passage 104 and a diaphragm valve 105 with a low pressure outlet 106. The valve 105 is responsive to the pressure in chamber 95 and is biased against this pressure by a tension spring 110. At a value of engine speed N which results in the pressure in chamber 95 overcoming a spring 110, the valve 105 shuts increasing the pressure in line 100, and as will later be described, increasing spill flow. The valve 105 thus acts as a top-speed limiter. The pressure in line 100 is thus dependent on the rate of flow through the valves 82, 85 and the restrictor 103, and this flow is dependent on the pressure difference across the metering device 52, as modified by a difference between calculated and sensed values of compressor outlet pressure P4. The control element 97 of the pilot valve 96 is, as previously described, positioned in accordance with the pressure in line 100 and the density-corrected pressure acting on the rotor 101, and the servo pressure signal on line 98 is thus dependent on engine speed N, fuel density $\rho$, metering pressure drop, and the difference between calculated and actual values of pressure P4, the calculated value of P4 being, in turn, dependent on desired thrust $\theta$ and the sensed value of P1. The servo pressure signal in line 98 is applied to a spill valve 107, connected between the outlet and inlet of the pump 51, an increase in the servo pressure signal in line 98 urging the valve 107 in a direction to decrease spill flow.

In use, the servo pressure control 90 is responsive to engine speed N and to the pressure in line 100 to maintain the fuel pressure difference between the inlet and outlet of the metering device 52 substantially constant for a given speed N and a given selected thrust $\theta$. If, however, the sensed value of pressure P4 is greater than the calculated value thereof, indicated by the cam 71, the cam follower 77 is pivoted anticlockwise, compressing the spring 84 and increasing flow through the valve 82, the pressure difference across the valve 82 nevertheless being maintained equal to the pressure difference across the metering device 58. This increase in flow through the valve 82 increases the pressure in line 100, up-stream of the restrictor 103, and the valve 96 moves to decrease the servo pressure signal in line 98, increasing spill flow from the pump 51 and reducing flow through the device 52. Correspondingly, if the sensed value of P4 is less than that derived from the cam 71, flow through the valve 82 is decreased, and the resultant decrease in pressure in line 80 increases the control pressure signal in line 98 and decreases spill flow, whereby fuel flow to the engine is increased, until the sensed value of P4 corresponds to that indicated by the cam 71.

The servo pressure control 90 includes a temperature-responsive valve 108 and a diaphragm valve 109 arranged in series, and in parallel with the series arrangement of the valves 103, 105. The valve 108 is responsive to the temperature T1 at the inlet of the engine compressor, such that a reduction in the temperature at this inlet opens the valve 108, reducing the pressure in line 100. The consequent increase in the servo pressure in line 98 decreases spill flow, and provides additional fuel for starting the engine 50 in cold conditions.

The system shown in FIG. 4 is a modification of that shown and described with reference to FIGS. 2 and 3, corresponding elements having been allocated identical reference numerals. In the system of FIG. 4 an alternative form of steady state control device 120 is substituted for the device 70 of FIGS. 2 and 3. The device 120 includes a three-dimensional compound cam 121 which is positioned axially by a stem 122 coupled to a control element of the variable metering device 52. The cam 121 is rotatable by a lever 123 in accordance with a desired thrust $\theta$ of the engine 50. The cam 121 is profiled so as to provide a plurality of calculated values of compressor inlet pressure P1 for a plurality of values of delivery pressure P4 and selected thrust $\theta$ which are used to position the cam 121. A cam follower 124 engages the cam 121 and a compression spring 125 is engaged between the follower 124 and one end of a lever control element 126 which is sealingly mounted for movement about a pivot 127. The lever 127 is operable to control flow through a valve 128 which communicates with the filter 57. A spring 129 biases the control element 126 in a direction to reduce flow through the valve 128. A bellows unit 130 is responsive to an increase in engine compressor inlet pressure P1 to urge the control element 126 to reduce flow through the valve 128.

A diaphragm valve 131 is responsive to the pressure immediately downstream of the shut-off valve 53 and to the pressure downstream of valve 128, to maintain these two pressures substantially equal. The pressure difference across the valve 128 is thus maintained substantially equal to that across the metering device 52. The valves 128, 131 are in series between the filter 57 and the line 100 which communicate, as previously described, with the servo pressure control 90.

In use, the metering device 52 is responsive to compressor pressures P3 and P4, as previously described, to control fuel flow to the engine 50. The cam follower 124 causes spring 125 to apply a torque to the control element 126 being dependent on a calculated value of pressure P1 for the actual values of pressure P4 and selected thrust $\theta$ which have been used to position the cam 121. If the torque applied by the spring 125 is greater than that applied through the bellows unit 130 by the sensed pressure P1, the control element 26 increases flow through the valve 28, increasing the pressure in line 100 and decreasing the servo pressure signal in line 98. Spill flow from the pump 51 is thereby increased and fuel flow to the engine 50 decreased. Correspondingly, if a sensed value of pressure P1 is greater than the calculated value derived from the cam 121, the pressure in line 100 is decreased, spill flow is also decreased, and fuel flow to the engine is increased.

The described embodiment of the present invention thus allow fuel control to a gas turbine engine to be controlled in accordance with a difference between the pressures at the engine compressor inlet and engine compressor outlet. Since engine thrust is directly proportional to ambient pressure and the ratio of the pressures at the compressor outlet and inlet, there is no requirement to modify fuel supply in accordance with ambient temperature. Furthermore, the fuel control system does not include valves through which gases from the engine compressor are required to flow, thereby avoiding the previously mentioned problems of over-heating and contamination.

We claim

1. A system for controlling fuel flow to a gas turbine engine in accordance with a difference between an inlet pressure and a delivery pressure of the engine, comprising a metering device having a control element, means for positioning said control element in accordance with a sensed value of said delivery pressure, means for modifying fuel flow through said metering device, a three-dimensional cam movable in response to a desired engine thrust and in response to one of said pressures, said cam being profiled in accordance with calculated values of the other of said pressures, said calculated values corresponding to combinations of said desired thrust and said one pressure, a cam follower co-operating with said cam, and control means responsive to the position of said cam follower and to a sensed value of said other pressure for operating said fuel flow modifying means.

2. A system as claimed in claim 1 in which said fuel flow modifying means is responsive to a servo pressure signal, and said control means comprises a pilot valve responsive to the position of said cam follower for modifying said servo pressure signal.

3. A system as claimed in claim 1 in which said metering device comprises a body with respect to which said control element is axially movable, and said flow modifying means comprises a sleeve movable relative to said body and said control element, and co-operating therewith to define a variable metering orifice.

4. A system as claimed in claim 1 in which said flow modifying means comprises a spill valve operable to spill fuel from the upstream side of said metering device.

5. A system as claimed in claim 4 in which said pilot valve is responsive to the pressure difference across said metering device.

6. A system as claimed in claim 5 in which said control means includes valve means, operable by said cam follower, for providing a control pressure which is dependent on said pressure difference and on a difference between said sensed and calculated values of said other pressure, said pilot valve being responsive to variations in said control pressure.

7. A system as claimed in claim 1 in which said cam is coupled to said control element for movement therewith in response to said sensed value of compressor delivery pressure.

8. A system as claimed in claim 1 in which said cam follower is mounted for movement about a pivotal axis whose position is dependent on the value of said one pressure.

9. A system as claimed in claim 8 in which the pivotal axis of said cam follower is movable by said metering device control element.

10. A system as claimed in claim 2 in which said control means includes a valve, operable at a predetermined level of engine speed, for causing said servo pressure signal to be varied in a sense which prevents said flow modifying means from increasing fuel flow.

11. A system as claimed in claim 2 or claim 10 in which said control means includes a further valve, operable at a predetermined lower level of engine temperature, for causing said servo pressure signal to be varied in a sense which prevents said flow modifying means from decreasing fuel flow.

* * * * *